J. S. JUAREZ.
AUTOMOBILE DIRECTION INDICATOR.
APPLICATION FILED JAN. 6, 1915.

1,195,476.

Patented Aug. 22, 1916.

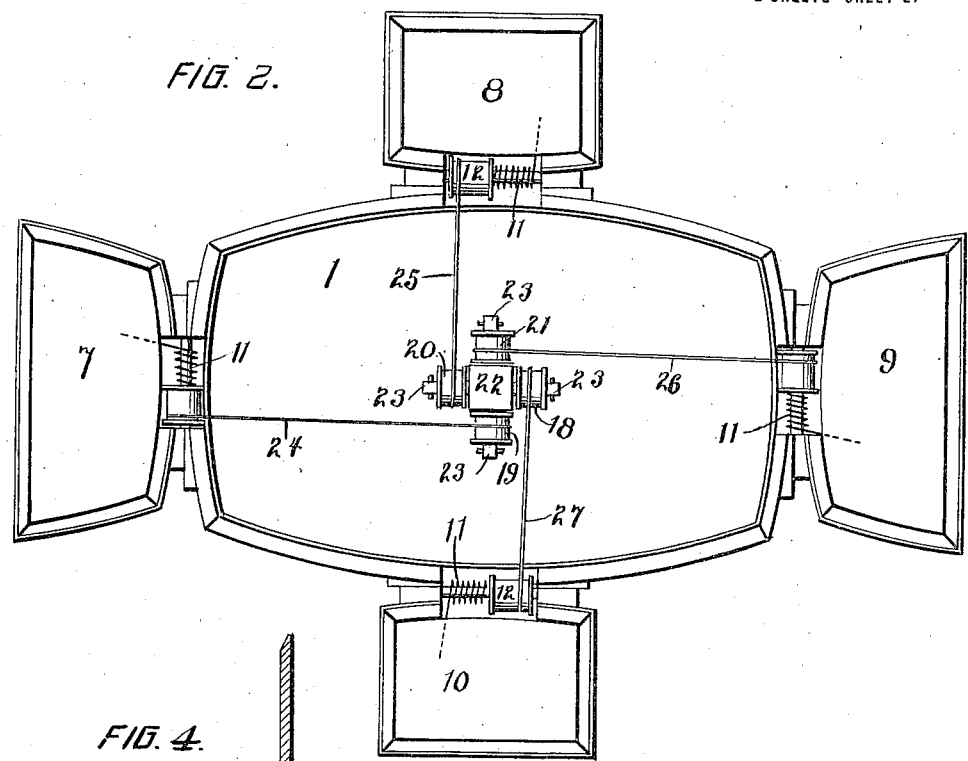
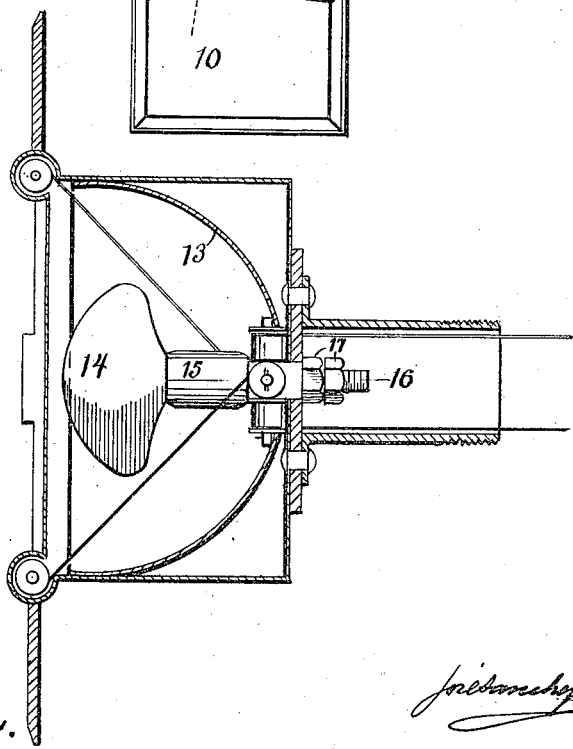

UNITED STATES PATENT OFFICE.

JOSÉ SANCHEZ JUAREZ, OF MEXICO, MEXICO.

AUTOMOBILE DIRECTION-INDICATOR.

1,195,476.   Specification of Letters Patent.   Patented Aug. 22, 1916.

Application filed January 6, 1915. Serial No. 779.

*To all whom it may concern:*

Be it known that I, José SANCHEZ JUAREZ, a citizen of the United States of Mexico, residing at 23 Amazonas street, Mexico city, in the Federal District and State of Mexico, Mexico, have invented certain new and useful Improvements in Automobile Direction-Indicators, of which the following is a specification.

This invention relates to signals for automobiles and similar vehicles, and more particularly to that type of signal carried by the rear of a vehicle to inform the operator of another car following the one on which the signal is carried of the movements and directions which the leading car is about to take.

It is one of the objects of the present invention to provide a signal of this character which is easily and cheaply manufactured, and to provide a signal which has fewest possible parts to get out of working order.

A further object of the present invention is to provide a device of the above stated character which is readily attachable to any make car, thus providing a signal which is practically universal in its application.

A further object of the invention is to provide a signal in which a single light and circuit is employed, the operating parts of the signal being purely mechanical.

Figure 1:
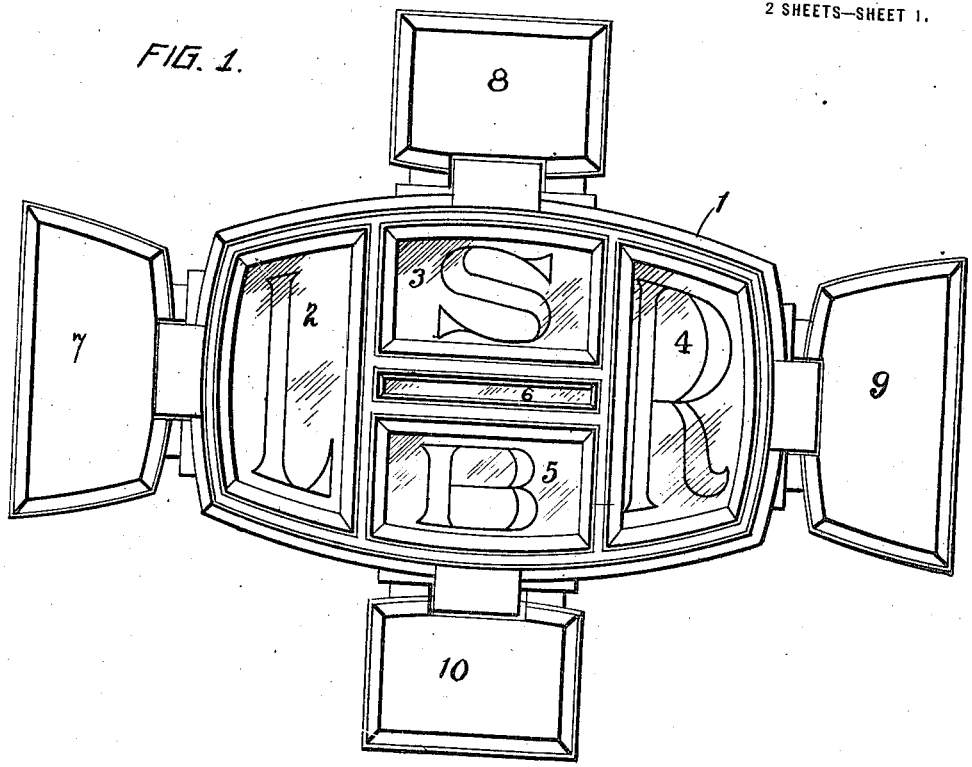
Figure 3:
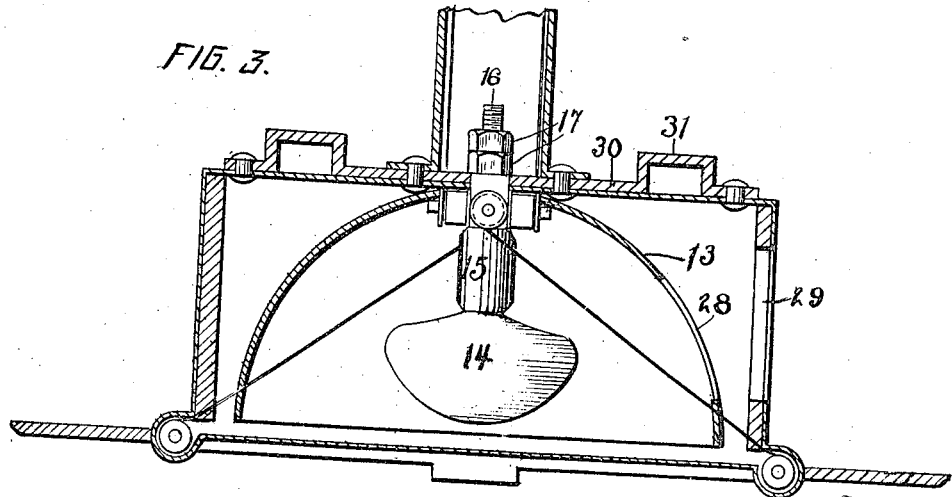

Referring to the drawings; Figure 1 is a view in elevation of the signal box showing the shutters in the open position; Fig. 2 is a view similar to Fig. 1, showing the front plate of the box removed; Fig. 3 is a horizontal sectional view of the box, and Fig. 4 is a vertical sectional view thereof.

Referring more particularly to the drawings, the invention consists of a box 1, the front wall of which is formed of transparent material such as glass, and is suitably divided into a plurality of spaces 2, 3, 4, 5 and 6.

The space 2 carries the designating character L meaning left; the space 4 carries the designating character R meaning right; the space 3 carries the designating character S meaning stop; the space 5 carries the designating character B meaning back, and the space 6 is provided with red glass or plain glass colored red to provide a danger or rear light signal such as all automobiles are required to carry.

Pivotally carried by the box structure 1 are a plurality of doors 7, 8, 9 and 10, the door 7 conforming in shape to the space 2, the door 8 conforming in shape to the space 3, the door 9 conforming in shape to the space 4, and the door 10 conforming in shape to the space 5. Each of the above mentioned doors is adapted to normally cover its respective space for a purpose hereinafter described.

Each of the above mentioned doors is mounted on a spring hinge 11, and forming a part of each of said hinges is a drum 12 the purpose of which will be hereinafter described.

Within the box 1, and supported from its rear wall is a reflector 13, and arranged centrally of said reflector is an incandescent light 14 which is seated in the socket member 15, which in turn is secured to the rear wall of the box by means of the threaded bolt 16 and nuts 17.

Around the squared portion 22 of the bolt 16 on each of its four sides are mounted drums 18, 19, 20 and 21, these drums being revolubly mounted on the pins 23 as shown in Fig. 2.

Passing around the aforementioned drum 12 of the door or shutter 7 is a cable 24, which cable passes around the center drum 19 and to the rear of the box where it passes out of the same, and is suitably secured to the steering mechanism of the machine in a manner not shown.

Passing around the drum 12 of the door or shutter 8 is a cable 25 which in turn passes around the central drum 20, and then out through the rear wall of the box, this cable being connected to the clutch lever of the machine not shown herein.

The cable 26 passes around the drum 12 of the door 9, and from thence it passes around the central drum 21 and out through the rear wall of the box to a point where it also is secured to the steering mechanism.

Passing around the drum 12 of the door or shutter 10 is a cable 27 which passes around the central drum 18, and out through the rear wall of the box to a point where it is attached to the brake lever in any suitable manner.

The outer face of the rear wall of the box is provided with a suitable bracket 30 having eyes 31 by which the device may be attached to a machine.

One side of the box is provided with a slot 29 and the reflector 23 is provided with a slot 28 in alinement therewith to provide means for illuminating a license number suitably supported at the side of the box.

When in operation the machine is standing still, the cable 25 which is connected to the clutch lever will, owing to the clutch being disconnected, open the door 8 against the tension of its spring hinge 11 displaying the space designated S thus showing that the car is standing still with its clutch in inoperative position. When the operator throws in the clutch lever, the cable 25 slackens when the door 8 under the influence of the spring hinge 11 closes thus closing the space 3 and leaving the box dark except for the red light 6. The operator now desiring to turn the car to the right, turns the steering gear in the proper direction which takes up on the cable 26 thus opening the door or shutter 9 and displaying the designating character R and indicating that the car is going to turn to the right. When the car is to be turned to the left, the steering mechanism is operated in the opposite direction, thus giving slack to the cable 26 and taking up on the cable 24, permitting the door or shutter 9 to close under the influence of the spring hinge, and opening the door or shutter 7 to display the designating character L indicating that the car is to be turned to the left. When the steering gear is again restored to the neutral position where the car is moving in a straightforward direction, all of the doors will close leaving only the red light 6 showing.

The cable 27 as above stated leads to the lever which controls the reversing mechanism, and it will be seen that upon operation of the reversing mechanism, the cable 27 will cause the door 10 to swing to open position thus displaying the designating character B indicating that the operator is going to drive the machine in the rearward direction. As soon as the reversing mechanism is released or thrown out, the cable 27 slackens and the door or shutter 10 is closed under the influence of its spring hinge 11.

From the foregoing it will be seen that the present invention not only provides a direction indicator which is readily attached to any well known car, but one which is positive and reliable in its operation, and which requires no attention on the part of the operator of the car.

Having thus described my invention what I claim as new, and desire to protect by Letters Patent is:

A direction indicator for motor vehicles including a lamp box, having its face divided into an upper, lower and central designating sections, and end designating sections, a hinged door for the upper, lower and end designating sections, a shaft for each door, a spring operated drum rigidly secured on each shaft, a central lamp supporting post, a shaft supported on each side of the lamp post, each of the shafts extending at right angles to the lamp supporting post and supporting a drum, a flexible member extending over each of the pulleys supported by the lamp post, the ends of the flexible members being wound on the drums of the doors, and a reflector positioned behind the lamp for reflecting light to all of the designating sections.

In testimony whereof I affix my signature in presence of two witnesses.

JOSÉ SANCHEZ JUAREZ.

Witnesses:
 ALONSO MARISCAL Y PINA.
 THOS. G. LEWIS